United States Patent

Band et al.

[11] Patent Number: 5,884,881
[45] Date of Patent: Mar. 23, 1999

[54] LEANING SUPPORT STRUCTURE EXPANDABLE BY A SINGLE HAND TO SUPPORT ELONGATED OBJECTS, SUCH AS GOLF CLUBS, IN AN UPRIGHT POSITION

[76] Inventors: Robert Evans Band, 3110 Segovia St., #3, Coral Gables, Fla. 33134; Arnold R. Gellman, 7801 Schoolhouse Rd., Miami, Fla. 33143

[21] Appl. No.: 789,058

[22] Filed: Jan. 28, 1997

[51] Int. Cl.$^6$ ................................................. A63B 55/10
[52] U.S. Cl. ........................ 248/166; 248/164; 211/70.2; 473/282
[58] Field of Search ................... 248/166, 156, 248/164, 431, 188, 188.9, 173, 176.1, 440.1, 530, 545, 96; 211/70.2; 473/282; 206/315.2, 315.3; 42/94

[56] References Cited

U.S. PATENT DOCUMENTS

| | | | |
|---|---|---|---|
| 482,625 | 9/1892 | Dunbar | 248/166 |
| 1,295,265 | 2/1919 | Bradley . | |
| 2,175,288 | 10/1939 | Florang | 248/166 |
| 2,542,040 | 2/1951 | MacLellan . | |
| 2,869,814 | 1/1959 | Hurlimann . | |
| 3,415,572 | 12/1968 | Zagwyn . | |
| 4,133,467 | 1/1979 | Mackniesh . | |
| 4,226,389 | 10/1980 | Neth | 248/96 |
| 4,311,264 | 1/1982 | Hurmence . | |
| 4,717,108 | 1/1988 | Liedle | 248/432 |
| 4,834,444 | 5/1989 | Young . | |
| 4,838,416 | 6/1989 | Carman | 206/375.2 |
| 4,917,341 | 4/1990 | Pirchio | 248/164 |
| 4,960,212 | 10/1990 | Wu | 211/70.2 |
| 5,056,198 | 10/1991 | Viglione . | |
| 5,102,078 | 4/1992 | Nordeng | 248/166 |
| 5,127,530 | 7/1992 | Ortuno | 211/70.2 |
| 5,226,666 | 7/1993 | Dinkens, Jr. . | |
| 5,230,507 | 7/1993 | White et al. | 473/282 |
| 5,285,990 | 2/1994 | Engel | 248/156 |
| 5,317,826 | 6/1994 | Underwood | 42/94 |
| 5,406,732 | 4/1995 | Peterson . | |
| 5,470,039 | 11/1995 | Hilger | 248/164 |
| 5,507,111 | 4/1996 | Stinson et al. | 42/94 |
| 5,713,547 | 2/1998 | Yu | 248/166 |

FOREIGN PATENT DOCUMENTS

| | | | |
|---|---|---|---|
| 8314 | 4/1908 | United Kingdom | 248/166 |

OTHER PUBLICATIONS

Brochure entitled "The Approach Shot Caddy", distributed by M. Link Inc., Ft. Lauderdale, Florida, 1994.

*Primary Examiner*—Derek J. Berger
*Assistant Examiner*—Stephen S. Wentsler
*Attorney, Agent, or Firm*—Lott & Friedland, P.A.

[57] ABSTRACT

A leaning support structure that is lightweight, expandable by a single hand and has a sturdy base without the need for insertion into the ground. The leaning support structure includes first and second elongated support members offset from each other, each support member having upper and lower ends and a predetermined connecting point. A handle may be placed on the upper end of the first elongated support member to cover the offset portion between the first and the second elongated support members, improving the feel and the aesthetic appearance. At the predetermined connecting points, a connector connects the elongated support members. A groove and a female securing portion are located in the upper half of the first elongated support member. A rod, which fits into the groove to limit the relative angle between the elongated support members, and a male securing portion are located in the upper half of the second elongated support member. In use, one places the lower end of the second elongated support member on a surface and extends the leaning support structure by applying pressure to the upper end of the first elongated support member, thereby forming a V-shaped opening above the predetermined connecting points. The leaning support structure is leaned against an article which is to be supported, and the article to be supported leans against and through the V-shaped opening. A high friction surface may be placed in the V-shaped opening to prevent slippage of the device to be supported.

25 Claims, 5 Drawing Sheets

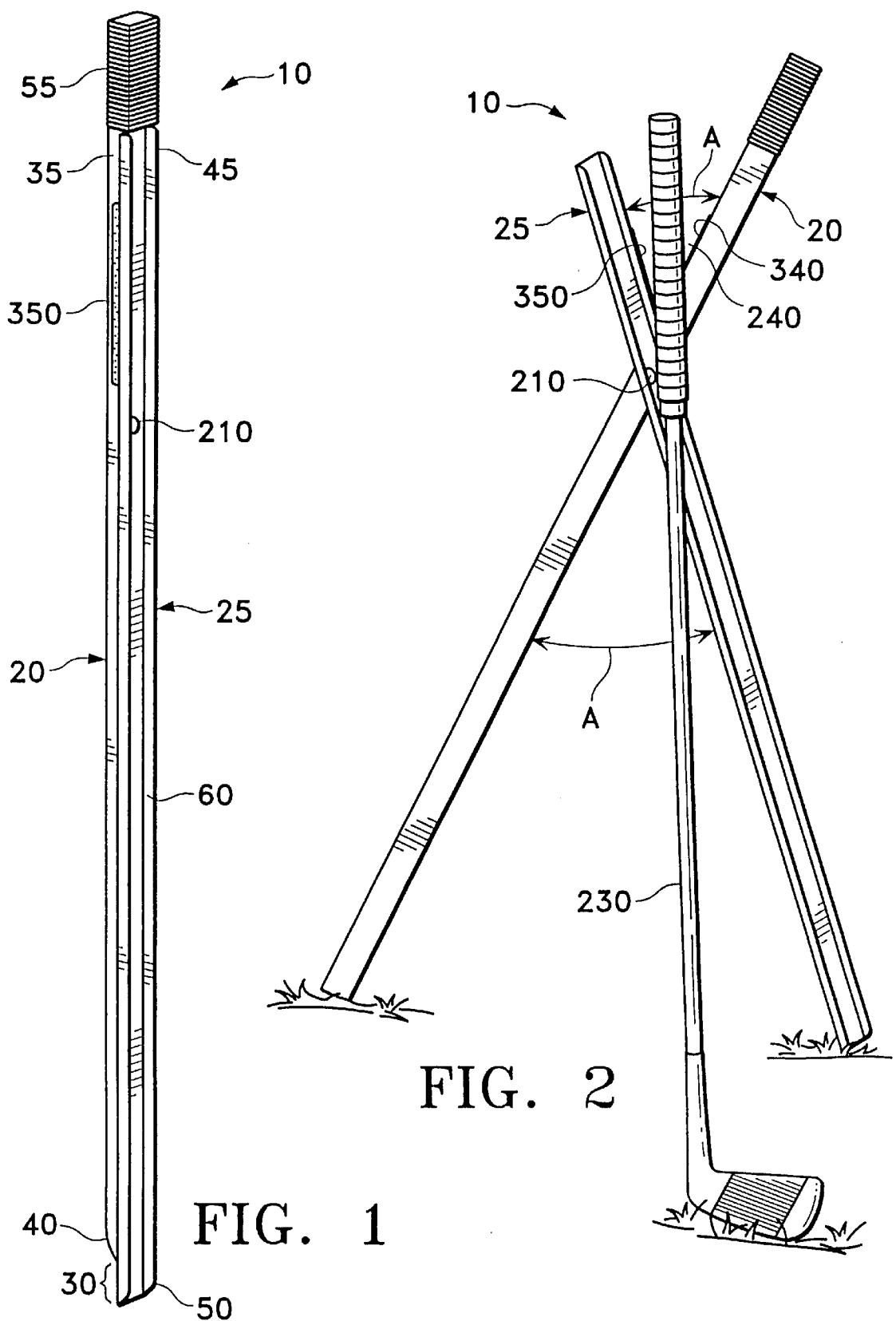

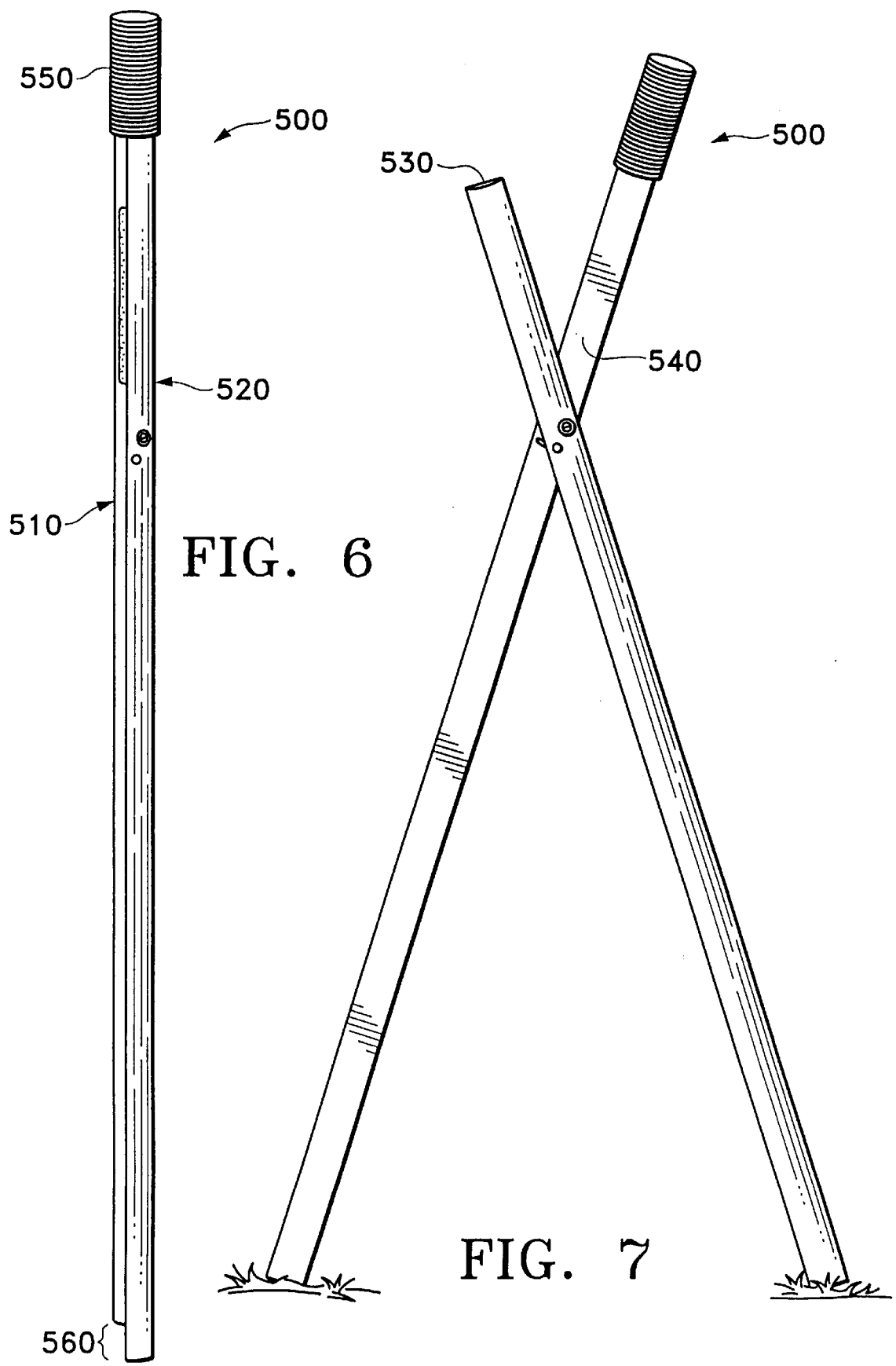

LEANING SUPPORT STRUCTURE EXPANDABLE BY A SINGLE HAND TO SUPPORT ELONGATED OBJECTS, SUCH AS GOLF CLUBS, IN AN UPRIGHT POSITION

TECHNICAL FIELD

This invention relates generally to supporting devices and specifically relates to a leaning support structure which provides support when an item is leaned up against it.

BACKGROUND OF THE INVENTION

Many devices and useful instruments which people use are not free standing. That is, they will not stay in the upright position absent a supporting device such as a wall, car, tree or some other structure up against which to lean them. Further, often it is very important for a device to maintain its upright condition. Examples of such devices include an umbrella, a rifle, a shovel, a rake and golf clubs in a golfing environment such as a golf course. Work persons such as road crews, construction workers and sanitation site employees frequently utilize shovels and picks in muddy conditions and need to exchange use between the two. If there is no supporting structure up against which to lean the pick while the worker is using the shovel, or if the worker is resting, the device will have to be laid in the mud. This significantly sullies the handle, thereby requiring cleaning. Further, upon returning from a break, it is much more difficult to locate the object with which one is working if it is flush against the ground.

These difficulties are also present with rakes in the yard or snow shovels on a sidewalk. Both devices become dirty, wet and hard to find unless placed in an upright position upon its non-use.

A golfer utilizes a plurality of clubs in a game of golf, all of which are stored in a golf bag which is usually situated on an electric golf cart. Often a golfer will remove several clubs from his golf bag for use with the next shot or few shots, and then walk a distance from the cart to the spot where his ball is lying. This situation frequently occurs near a green when a golfer removes a pitching wedge, sand wedge and a putter from his golf bag and brings them with him to the green. It also occurs on many golf courses that enforce a cart-path-only or a ninety-degree rule with respect to the use of electric golf carts. Such rules require that the golfer leave the golf cart on the cart path and walk, clubs in hand, to his ball. This requires the golfer to carry more than one club, so that upon reaching his ball, he can decide which club to use for the shot. The problem often encountered is having to place the golf club(s) not chosen for the shot on the ground in order to hit the shot. The ground is often wet from rain, watering or morning dew. This causes a wet and slippery grip for subsequent shots. Further, as with the shovel above, the clubs are often forgotten when parallel and adjacent to the ground. This problem can also occur while practicing at a driving range or a putting green. Also, laying the clubs not selected for the shot on the ground next to where the ball is lying requires the golfer to bend down to pick up the clubs. Such bending is often a problem for golfers with back or other physical disabilities.

Attempts have been made to solve the foregoing problems. U.S. Pat. No. 5,285,990 to Engel discloses a golf club rest. However, this device has a number of drawbacks that the instant invention overcomes. Engel's golf club rest utilizes an "elongated shaft member" and a "ground penetrating segment." Since the shaft member is a single shaft and is only supported by a ground penetrating segment, it is inherently unstable. Consequently, when more than one club is placed on the device and the wind is blowing it will likely fall over. Also, if the ground is soft it will fall over easily. If it falls over, it could dig up grass, which harms the course. If the ground is too hard, the ground penetrating segment will not be able to penetrate the ground and the rest will not stand at all. Finally, many areas of a golf course, such as greens and tee areas, will not allow ground penetrating or indentation to take place at all because it will mar the surface. Lastly, since the device is penetrating into the ground, dirt, mud, grass, sand and the like will adhere to the device, creating a cleaning requirement. Thus, there is currently a long felt need for a support structure that does not require penetration into the ground and is more stable.

U.S. Pat. No. 5,406,732 to Peterson discloses a Rifle/Pistol Rest. The Peterson rest does not require insertion into the ground and is stable when an object is leaned against it; however, it uses a slip/swivel/clamp to connect the pair of elongated rods together thereby increasing significantly the weight, transportability and cost of manufacture of the device. Further, the device is bulky and cannot be quickly set up for use and then compressed for carrying. The Peterson device, if used in a setting such as carrying golf clubs to a green with a requirement for a quick setup to support a golf club which is not being used, then quick closure for carrying such clubs will not work. It would be difficult and time consuming to carry the heavy device with several clubs (it would be easier to just carry the golf bag itself) and then set up the slip/swivel/clamp in position for leaning against the unused clubs.

One possible solution to these problems is to provide a supporting device which utilizes a pair of light weight elongated supports connected via a light weight, low cost connecting means. Another possible solution is to provide a maximum separation angle stopper located therein. Yet another possible solution is to have offset elongated supports with a handle which allow easy one-handed setup and closure. Another possible solution is to provide a structure which is not inserted into the ground.

Thus, there is a need in the art for a supporting device which utilizes a pair of light weight elongated supports connected via a light weight, low cost connecting means.

There is a further need in the art for a supporting device which provides a maximum separation angle stopper in a leaning support structure which allows for a maximum separation angle between elongated support members.

There is also a need in the art for a supporting device which has offset elongated support members with a handle which allow easy one-handed setup and closure.

There is an additional need in the art to provide a structure which is not inserted into the ground.

SUMMARY OF THE INVENTION

The present invention solves significant problems in the art by providing a leaning support structure which is light weight, expandable by a single hand and provides a sturdy base without the need for insertion into the ground. Generally described, the invention is a leaning support structure including a first elongated support member having a first upper end, a first lower end, and a first connecting point located at a predetermined location intermediate the first upper end and the first lower end; a second elongated support member having a second upper end, a second lower end and a second connecting point located at a predetermined location intermediate the second upper end and the second lower end; a connector for joining the first elongated support member to the second elongated support member such that the first connecting point abuts the second connecting point; and a means for limiting the relative angle between the first and second elongated support members located at a predetermined location intermediate the upper and lower ends of the first and second elongated members.

The connector allows for slidable extension and closure of the first and second elongated support members relative to each other. The connector includes a female securing portion in the upper half of the first elongated support member and a male securing portion located in the upper half of the second elongated support member which fits into the female securing portion of the first elongated support member. The means for limiting the relative angle between the first and second elongated support members includes a groove in the upper half of the first elongated support member and a rod extending from the second elongated support member in the upper half of the second elongated support member, which fits into the groove to limit the relative angle, when extended, between the first and second elongated support members.

In one aspect the groove is arcuate. The female securing portion is an opening in the first elongated support member, a nut and a washer. The male securing portion is a metal pin with incised threads and a broad slotted head that can be driven as a fastener through the opening of the first elongated support member. In another aspect, the connector is a rivet or a snap.

The first and second elongated support members are offset such that the first upper end of the first elongated support member extends above the second upper end of the second elongated support member and the second lower end of the second elongated support member correspondingly extends below the first lower end of the first elongated support member. A V-shaped opening on which an elongated object rests is formed when the elongated members are extended. The angle of the V-shaped opening is approximately thirty-five degrees. The elongated object can be a golf club, a shovel, an umbrella, a rifle, a fishing rod, a mop, a broom or a lawn tool.

In yet another aspect, the leaning support structure further includes a handle located on the upper end of the first elongated support member. The handle is flush with the second elongated support member.

In still another aspect, a covering is attached to the bottoms of the lower ends of the elongated support members. The coverings can be rubber feet or plastic feet.

In another aspect, strips can be attached to the interior of the first and second elongated support members above the first and second connecting points.

In an alternative embodiment, the first elongated support member is semi-cylindrical shaped and the second elongated support member is semi-cylindrical shaped with the flat portion of the semi-cylindrical shaped first elongated support member immediately adjacent the flat portion of the semi-cylindrical shaped second elongated support member when in the closed position.

The connector allows for slidable extension and closure of the first and second elongated support members relative to each other. The connector includes a female securing portion in the upper half of the first elongated support member and a male securing portion located in the upper half of the second elongated support member which fits into the female securing portion of the first elongated support member. The means for limiting the relative angle between the first and second elongated support members includes a groove in the upper half of the first elongated support member and a rod extending from the second elongated support member in the upper half of the second elongated support member, which fits into the groove to limit the relative angle, when extended, between the first and second elongated support members.

In one aspect of this alternative embodiment the groove is arcuate. The female securing portion is an opening in the first elongated support member, a nut and a washer. The male securing portion is a metal pin with incised threads and a broad slotted head that can be driven as a fastener through the opening of the first elongated support member. In another aspect, the connector is a rivet or a snap.

The first and second elongated support members are offset such that the first upper end of the first elongated support member extends above the second upper end of the second elongated support member and the second lower end of the second elongated support member correspondingly extends below the first lower end of the first elongated support member. A V-shaped opening on which an elongated object rests is formed when the elongated members are extended. The angle of the V-shaped opening is approximately thirty-five degrees. The elongated object can be a golf club, a shovel, an umbrella, a rifle, a fishing rod, a mop, a broom or a lawn tool.

In yet another aspect of this alternative embodiment, the leaning support structure further includes a handle located on the upper end of the first elongated support member. The handle is flush with the second elongated support member.

In still another aspect of this alternative embodiment, a covering is attached to the bottoms of the lower ends of the elongated support members. The coverings can be rubber feet or plastic feet.

In another aspect of this alternative embodiment, strips can be attached to the interior of the first and second elongated support members above the first and second connecting points.

In yet another embodiment of the invention, a method of supporting an elongated object is also provided. The method includes the steps of providing a leaning support structure as described above, placing the second elongated support member on a horizontal surface and applying lateral pressure on the first elongated support member until the elongated support members extend to a predetermined extension angle; and abutting an elongated object against, and in a leaning fashion, the V-shaped opening above the connecting points of the elongated support members; whereby the leaning support structure and the elongated object mutually support each other.

In one aspect the method also includes the steps of removing the elongated object from the V-shaped opening; gripping the first elongated support member; and applying pressure to the second elongated support to reduce the extension angle to zero degrees.

Accordingly, it is an object of the present invention to provide a device which can support an object, such as a golf club, thereby preventing the object from having to be laid on the ground.

Other objects of the present invention are to provide a leaning support structure that is lightweight, compact, low cost to manufacture and easily extended by one hand.

It is yet another object of the present invention to provide a leaning support structure that can be placed in a golf club carrier.

It is still another object of the present invention to provide a leaning support structure that does not require being inserted into the ground and provides for a sufficiently wide extension to maintain greater stability.

A feature of the invention is that the leaning support structure has two offset elongated members.

Another feature of the invention is that a handle is provided.

Yet another feature of the invention is that there is a groove and rod mechanism which provides for a maximum extension angle.

An advantage of the invention is that it can be easily opened and closed with one hand.

Another advantage of the invention is that one need not insert the leaning support structure into the ground for it to be operational.

Still another advantage of the invention is that since the leaning support structure is not inserted into the ground, it does not pick up dirt which could soil a user's golf bag, clubs or clothing.

Yet another advantage of the invention is that the leaning support structure is light weight and easily fits into a golf bag or other type of carrier.

Another advantage of the invention is that one is less likely to leave his golf clubs or other items behind, since they are more readily visible when upright and supported by the leaning support structure.

Still another advantage of the invention is that golf clubs or other items supported by the leaning support structure do not have to rest on the ground and thus do not get soiled.

Yet another advantage of the invention is that one does not have to bend down to retrieve items that are supported by the leaning support structure.

Another advantage of the invention is that a flag stick, when removed from a golf hole, may be leaned against the leaning support structure, thereby helping the golfer avoid bending to pick up the flag stick off the ground where it would be otherwise laid, and protecting the green from indentations caused when golfers drop the flag stick after removing it from the hole.

These and other objects, features, and advantages of the present invention may be more clearly understood and appreciated from a review of the following detailed description of the disclosed embodiments and by reference to the appended drawings and claims.

BRIEF DESCRIPTION OF THE DRAWING FIGURES

FIG. 1 is a perspective view of the leaning support structure of the present invention in a closed position with a handle.

FIG. 2 is a plan view of the leaning support structure of the present invention in an open and tilted forward position supporting a golf club.

FIG. 6 is a perspective view of the leaning support structure in a cylindrical form in a closed position.

FIG. 7 is a plan view of the leaning support structure in a cylindrical form in an open position.

DETAILED DESCRIPTION OF THE PREFERRED EMBODIMENT

Figure 8:
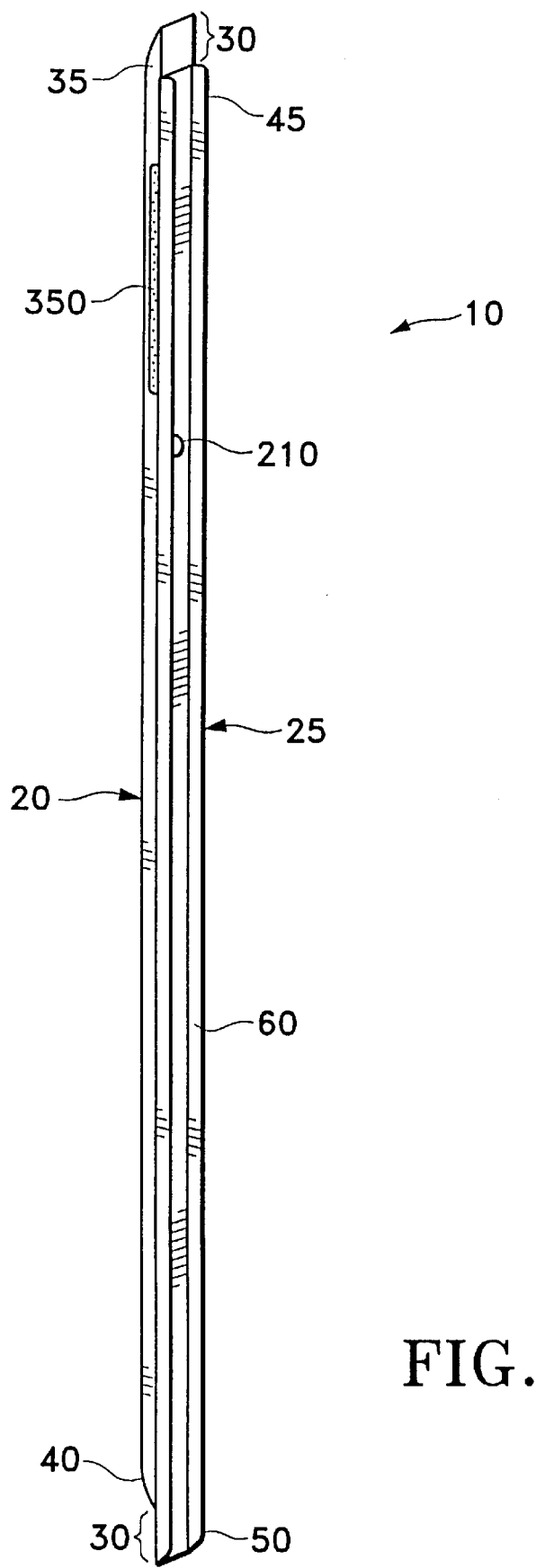
FIG. 8 is a perspective view of the leaning support structure of the present invention in a closed position without a handle.

Referring initially to FIGS. 1 and 8 of the drawings, in which like numerals indicate like elements throughout the several views, in a preferred embodiment the leaning support structure of this invention is generally illustrated by reference numeral 10. FIGS. 1 and 8 depict leaning support structure 10 in the closed position. Leaning support structure 10 includes a first elongated support member 20 and a second elongated support member 25. Elongated support members 20, 25 are preferably rectangular (FIGS. 1–5 and 8) or semi-cylindrical strips (FIGS. 6 and 7) made of metal, wood, plastic, graphite or other suitable materials. In the rectangular strip embodiment, elongated support members 20, 25 may have perpendicular edges 60. First elongated support member 20 and second elongated support member 25 are offset a distance 30 from each other at the top and the bottom of elongated support members 20, 25. Offset distance 30 is approximately one inch to three inches. Offset distance 30 allows for second elongated support member 25 to make contact with the horizontal surface on which it is to be placed first, thereby allowing for ease of extension.

For single-handed extension, all that is required is to place second elongated support member 25 on the surface and then apply lateral pressure on first elongated support member 20. This pressure will cause elongated support members 20, 25 to extend (see FIG. 2.) Subsequently, the device that is to be supported can be placed in the appropriate supporting position (described in detail infra) by a user's other hand. First elongated support member 20 has an upper end 35 and a lower end 40. Second elongated support member 25 has an upper end 45 and a lower end 50. First elongated support member 20 has a first predetermined connecting point 220 (see FIG. 5.) Second elongated support member 25 has a second predetermined connecting point 210 (see FIG. 4.) Elongated support members 20, 25 are connected at connecting points 210, 220.

Referring to FIG. 1, a handle 55 may be integral with upper end 35 of first elongated support member 20 to cover offset distance 30 (see FIG. 8) between upper ends 35, 45 of first and second elongated support members 20, 25, respectively, such that handle 55 is flush with second elongated support member 25, making upper ends 35, 45 appear not to be offset. Handle 55 also provides a more aesthetic appearance. Handle 55 may include indentations for one's fingers. Handle 55 is approximately four to five inches long.

Figure 3:
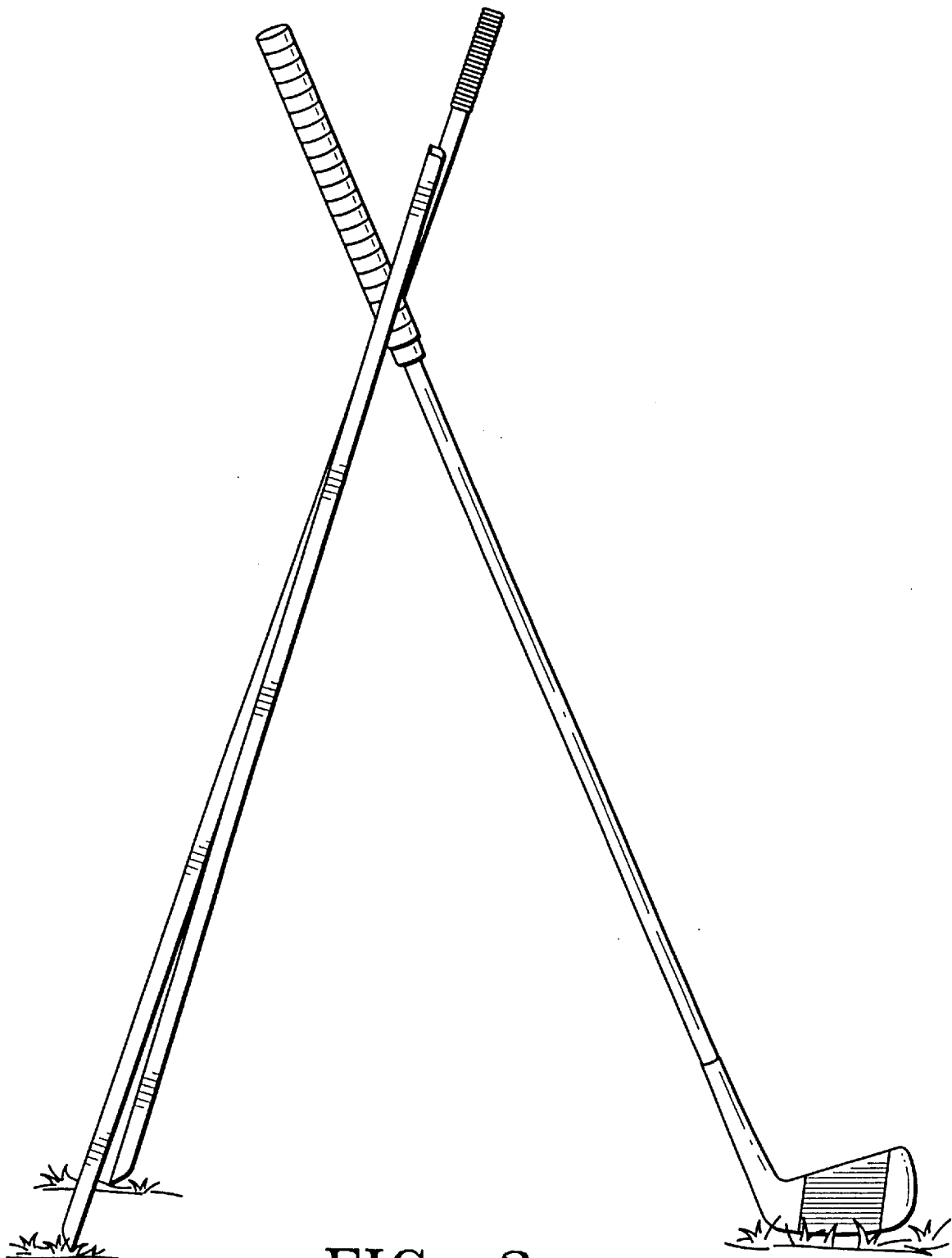
FIG. 3 is a side view of the leaning support structure of the present invention in an open position supporting a golf club.

FIG. 2 shows leaning support structure 10 in the open position. When leaning support structure 10 is in the open position, elongated support members 20, 25 form a V-shaped opening 240 with an angle A which is approximately 35 degrees. FIG. 3 shows a side view of leaning support structure 10 supporting a golf club, and illustrates how leaning support structure 10 and a golf club or other elongated device mutually support each other.

Figure 4:
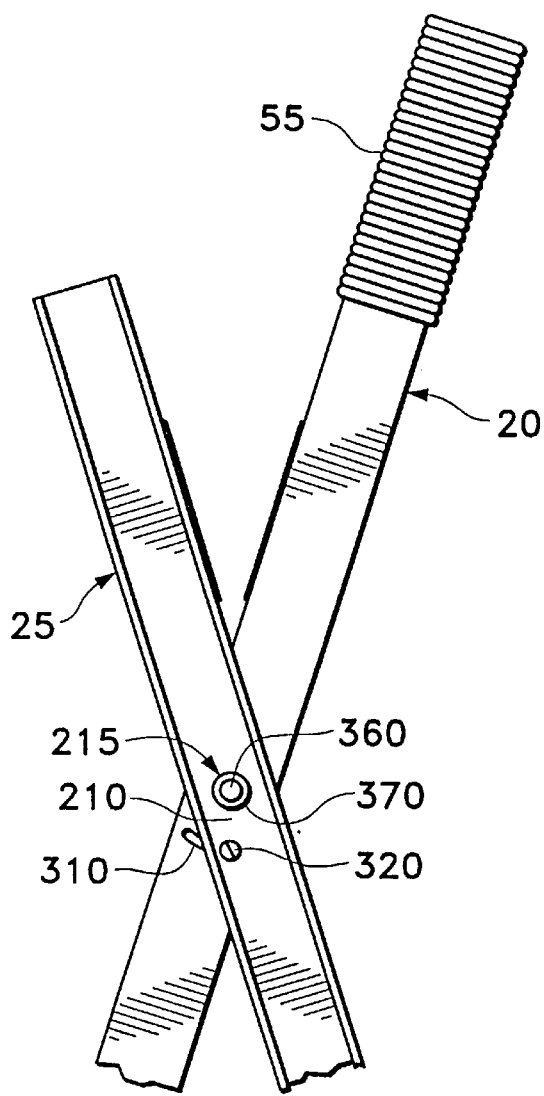
FIG. 4 is an enlarged front view of the connector and means for limiting the relative angle of the leaning support structure of the present invention.
Figure 5:
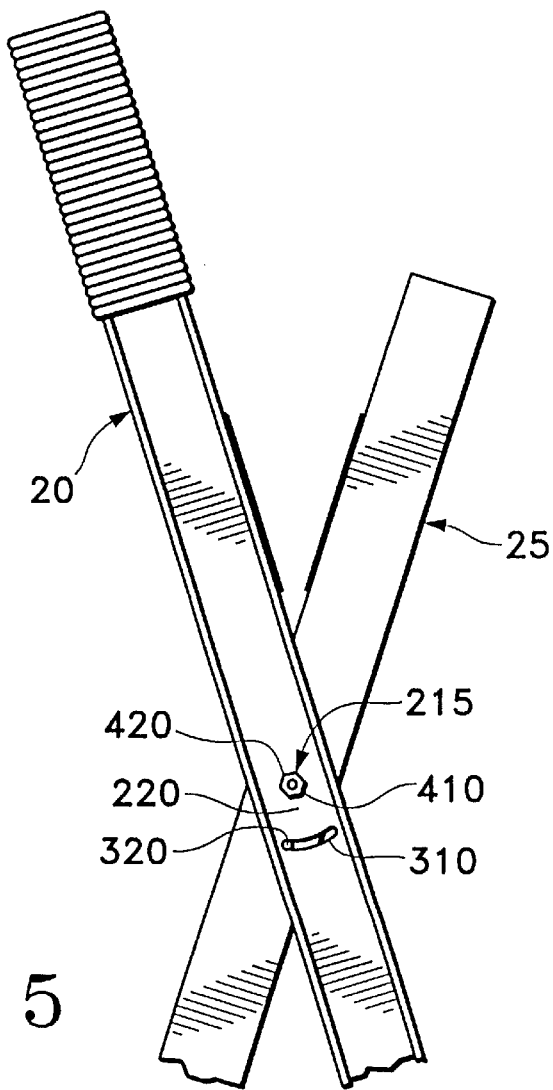
FIG. 5 is an enlarged back view of the connector and means for limiting the relative angle of the leaning support structure of the present invention.

At predetermined connecting points 210, 220, a connector 215 (shown in more detail in FIGS. 4 and 5) connects first elongated support member 20 and second elongated support member 25. FIG. 4 depicts a front view of connector 215 and FIG. 5 depicts a back view of connector 215. Connector 215 allows for slidable swivel action when placing leaning support structure 10 in the open position. A groove 310 and a female securing portion 410 are located in the upper portion of first elongated support member 20. Groove 310 may be arcuate or some other shape suitable to allow for extension of elongated support members 20, 25. Female securing portion 410 is an opening through which a screw 360 with a low friction washer 370 set between the head of screw 360 and second elongated support member 25 can be inserted. A male securing portion, such as screw 360, can be secured with a nut 420 with a low friction washer (not shown) between nut 420 and first elongated support member 20 to allow for smooth extension. Screw 360 is located in the upper portion of second elongated support member 25. Screw 360 can be a metal pin with incised threads and a broad slotted head that can be driven as a fastener, such as by turning with a screwdriver. Connector 215 can also be a rivet, a snap or other type of fastener structure. A rod or a boltless and smooth screw 320 fits into groove 310 to limit the relative angle between first elongated support member 20 and second elongated support member 25 when leaning support structure 10 is in the open position. Rod 320 may be integral with and extend from second elongated support member 25.

In order to improve the feel and aesthetics as well as to allow for a structure that can be inserted into in a golf bag, a preferred cylindrical embodiment of a leaning support structure of the present invention is depicted in FIGS. 6 and 7 as 500. In this embodiment, a first elongated support member 510 is semi-cylindrical-shaped and a second elongated support member 520 is also semi-cylindrical shaped with a flat portion 530 of semi-cylindrical shaped first elongated support member 510 immediately adjacent a flat portion 540 of semi-cylindrical-shaped second elongated support member 520, such that when in the closed position a full cylindrical shape is formed but for offset ends 560 of elongated support members 510, 520. First elongated support member 510 may have a handle 550 integral with first elongated support member 510 to cover the offset portion 560 at the upper end (not shown), such that handle 550 is flush with second elongated support member 520. FIG. 7 illustrates the cylindrical embodiment in an open position.

In the embodiment primarily used with golf clubs, elongated support members 20, 25 are approximately 36–39 inches tall. The total length of leaning support structure 10 (from lower end 50 of second elongated support member 25 to the top of handle 55) is approximately 41 inches. This height allows leaning support structure 10 to be inserted in a golf bag which is approximately 36 inches tall, such that the grip portion of handle 55 extends beyond the top of the golf bag when leaning support structure 10 is inserted into the golf bag. This allows for easy retrieval of leaning support structure 10 from the golf bag. The width of elongated support members 20, 25 is approximately ⅝ to ⅞ of an inch. Handle 55 is approximately four to six inches in length and covers upper end 35 of first elongated support member 20. The finish of leaning support structure 10 can be anodized, painted or coated with resins, epoxies or other suitable materials. The bottoms of lower ends 40, 50 of elongated support members 20, 25 may be covered or finished with rubber feet, plastic feet or other suitable materials. In any event, the bottoms of lower ends 40, 50 are finished such that they do not indent or otherwise mar the ground surface.

In use, as shown in FIGS. 2 and 3, leaning support structure 10 is opened, then leaned against an article, such as a golf club 230, such that golf club 230 rests in V-shaped opening 240. To prevent slipping of the article to be supported, foam or rubber pads 340, 350 may be secured to the interior portions of elongated support members 20, 25 at V-shaped opening 240.

A typical use scenario will have a golfer removing leaning support structure 10 or 500 from his golf bag along with several clubs, one of which he will choose for his next shot. For ease of discussion, the following description will refer only to leaning support structure 10, though it should be understood that the following applies to both use of the rectangular strip embodiment 10 and the cylindrical embodiment 500, as well as other-shaped embodiments. The golfer can carry the clubs in one hand and leaning support structure 10 in the other. One hand can be used to open leaning support structure 10 by placing lower end 50 of second elongated support member 25 on the surface and then applying lateral pressure to upper end 35 (or handle 55 if there is a handle) of first elongated support member 20. This pressure will cause support members 20, 25 to extend into the open position. He will rest the heads of clubs 230 on the surface and lean the clubs 230 toward leaning support structure 10, resting the grip portion of clubs 230 in V-shaped opening 240 formed when elongated members 20, 25 are open. He will select the club with which to hit his next shot, leaving the clubs not chosen resting against leaning support structure 10. When finished with the chosen club, the user will remove the clubs from V-shaped opening 240 with one hand and apply pressure to second elongated support member 25 with the other hand. This will place leaning support structure 10 in the closed position. The user will then repeat the steps as he so desires for future shots. Also, when the golfer removes the flag stick from the hole, he can rest the flag stick in V-shaped opening 240 along with any clubs he many be leaning in V-shaped opening 240.

Leaning support structure 10 or 500 may be stored inside a golf bag or inside a sheath attached to the outside of a golf bag. It may also be attached to the golf bag by a hook means or a hook and loop fastener means.

From the foregoing description those skilled in the art will appreciate that all of the objects of the present invention are realized. A leaning support structure for devices such as golf clubs, shovels and other elongated objects has been shown and described which is light weight and which allows easy one-handed setup and closing.

While specific embodiments have been shown and described, many variations are possible. For instance, leaning support structure 10 or 500 can be constructed in various sizes and materials, depending on the user's height and the application. The leaning support structure of this invention could also be used in a variety of indoor and outdoor applications, such as a support for brooms, mops, picks, hoes, fishing rods, and other household, garden, sports and/or industrial items. The elongated members can be constructed in various shapes, such as triangular, rectangular and other geometrically-shaped strips.

Accordingly, it will be understood that the preferred embodiment and alternative embodiments of the present invention have been disclosed by way of example and that other modifications and alterations may occur to those skilled in the art without departing from the scope and spirit of the appended claims.

What is claimed is:

1. A leaning support structure, comprising:
   a first elongated support member having a first upper end, a first lower end, and a first connecting point located at a predetermined location intermediate said first upper end and said first lower end;
   a second elongated support member having a second upper end, a second lower end and a second connecting point located at a predetermined location intermediate said second upper end and said second lower end, wherein said first and second elongated support members are offset such that said first upper end of said first elongated support member extends above said second upper end of said second elongated support member and said second lower end of said second elongated support member correspondingly extends below said first lower end of said first elongated support member;

a connector for joining said first elongated support member to said second elongated support member such that said first connecting point abuts said second connecting point;

a handle located on said first upper end of said first elongated support member and flush with said second elongated support member; and a means for limiting a relative angle between said first and second elongated support members located at a predetermined location intermediate said upper and lower ends of said first and second elongated members.

2. The leaning support structure of claim 1, wherein said connector allows for slidable extension and closure of said first and second elongated support members relative to each other.

3. The leaning support structure of claim 1, wherein said connector comprises:

a female securing portion in an upper half of said first elongated support member; and a male securing portion located in an upper half of said second elongated support member which fits into said female securing portion of said first elongated support member.

4. The leaning support structure of claim 3, wherein said female securing portion comprises an opening in said first elongated support member, a nut and a washer.

5. The leaning support structure of claim 4, wherein said male securing portion is a metal pin with incised threads and a broad slotted head that can be driven as a fastener through said opening of said first elongated support member.

6. The leaning support structure of claim 1, wherein said means for limiting the relative angle between said first and second elongated support members comprises:

a groove in an upper half of said first elongated support member; and a rod extending from said second elongated support member in an upper half of said second elongated support member, which rod fits into said groove to limit the relative angle, when extended, between said first and second elongated support members.

7. The leaning support structure of claim 6, wherein said groove is arcuate.

8. The leaning support structure of claim 1, wherein a V-shaped opening is formed when said elongated members are extended into an open position, wherein said V-shaped opening is for resting an elongated object.

9. The leaning support structure of claim 8, wherein said V-shaped opening, when said elongated members are extended into an open position, comprises an angle of approximately thirty-five degrees between said elongated members.

10. The leaning support structure of claim 1, further comprising a pair of strips attached to an interior portion of said first and second elongated support members above said first and second connecting points.

11. A leaning support structure, comprising:

a first elongated support member having a first upper end, a first lower end, and a first connecting point located at a predetermined location intermediate said first upper end and said first lower end;

a second elongated support member having a second upper end, a second lower end and a second connecting point located at a predetermined location intermediate said second upper end and said second lower end, wherein said first elongated support member is semi-cylindrical shaped and said second elongated support member is semi-cylindrical shaped with a flat portion of said semi-cylindrical shaped first elongated support member immediately adjacent a flat portion of said semi-cylindrical shaped second elongated support member when in a closed position, and further wherein said first and second elongated support members are offset such that said first upper end of said first elongated support member extends above said second upper end of said second elongated support member and said second lower end of said second elongated support member correspondingly extends below said first lower end of said first elongated support member;

a connector for joining said first elongated support member to said second elongated support member such that said first connecting point abuts said second connecting point;

a handle located on said first upper end of said first elongated support member and flush with said second elongated support member; and a means for limiting a relative angle between said first and second elongated support members located at a predetermined location intermediate said upper and lower ends of said first and second elongated members.

12. The leaning support structure of claim 11, wherein said connector allows for slidable extension and closure of said first and second elongated support members relative to each other.

13. The leaning support structure of claim 11, wherein said connector comprises:

a female securing portion in an upper half of said first elongated support member; and a male securing portion located in an upper half of said second elongated support member which fits into said female securing portion of said first elongated support member.

14. The leaning support structure of claim 13, wherein said female securing portion is an opening in said first elongated support member, a nut and a washer.

15. The leaning support structure of claim 14, wherein said male securing portion is a metal pin with incised threads and a broad slotted head that can be driven as a fastener through said opening of said first elongated support member.

16. The leaning support structure of claim 11, wherein said means for limiting the relative angle between said first and second elongated support members comprises:

a groove in an upper half of said first elongated support member; and a rod extending from said second elongated support member in an upper half of said second elongated support member, which rod fits into said groove to limit the relative angle, when extended, between said first and second elongated support members.

17. The leaning support structure of claim 16, wherein said groove is arcuate.

18. The leaning support structure of claim 11, wherein a V-shaped opening is formed when said elongated members are extended into an open position, wherein said V-shaped opening is for resting an elongated object.

19. The leaning support structure of claim 18, wherein said V-shaped opening, when said elongated members are extended into an open position, comprises an angle of approximately thirty-five degrees between said elongated members.

20. The leaning support structure of claim 11, further comprising a pair of strips attached to an interior portion of said first and second elongated support members above said first and second connecting points.

21. A golf club stand, comprising:
- a first elongated support member having a first upper end, a first lower end and a first connecting point located at a predetermined location intermediate said first upper end and said first lower end;
- a second elongated support member having a second upper end, a second lower end and a second connecting point located at a predetermined location intermediate said second upper end and said second lower end;
- an opening in an upper half of said first elongated support member;
- a metal pin with incised threads and a broad slotted head that can be driven as a fastener through said opening of said first elongated support member located in an upper half of said second elongated support member which fits into said opening of said first elongated support member and is secured by a nut and a washer; whereby said opening and said metal pin, when fastened, allow for slidable extension and closure of said first and second elongated support members relative to each other;
- a handle integral with said first upper end of said first elongated support member which is flush with said second elongated support member; and
- a means for limiting a relative angle between said first and second elongated support members comprising an arcuate groove in the upper half of said first elongated support member and a rod extending from said second elongated support member in the upper half of said second elongated support member, which fits into said groove to limit the relative angle, when extended, between said first and second elongated support members;
- wherein said first and second elongated support members are offset such that said first upper end of said first elongated support member extends above said second upper end of said second elongated support member and said second lower end of said second elongated support member correspondingly extends below said first lower end of said first elongated support member.

22. The leaning support structure of claim 21, wherein said first elongated support member is semi-cylindrical shaped and said second elongated support member is semi-cylindrical shaped with a flat portion of said semi-cylindrical shaped first elongated support member immediately adjacent a flat portion of said semi-cylindrical shaped second elongated support member when in a closed position.

23. A leaning support structure, comprising:
- a first elongated support member having a first upper end, a first lower end, and a first connecting point located at a predetermined location intermediate said first upper end and said first lower end;
- a second elongated support member having a second upper end, a second lower end and a second connecting point located at a predetermined location intermediate said second upper end and said second lower end, wherein said first elongated support member is semi-cylindrical shaped and said second elongated support member is semi-cylindrical shaped with a flat portion of said semi-cylindrical shaped first elongated support member immediately adjacent a flat portion of said semi-cylindrical shaped second elongated support member when in a closed position;
- a connector for joining said first elongated support member to said second elongated support member such that said first connecting point abuts said second connecting point;
- a handle located on said first upper end of said first elongated support member and flush with said second elongated support member; and
- a means for limiting a relative angle between said first and second elongated support members located at a predetermined location intermediate said upper and lower ends of said first and second elongated members.

24. A leaning support structure, comprising:
- a first elongated support member having a first upper end, a first lower end, and a first connecting point located at a predetermined location intermediate said first upper end and said first lower end;
- a second elongated support member having a second upper end, a second lower end and a second connecting point located at a predetermined location intermediate said second upper end and said second lower end, wherein said first elongated support member is semi-cylindrical shaped and said second elongated support member is semi-cylindrical shaped with a flat portion of said semi-cylindrical shaped first elongated support member immediately adjacent a flat portion of said semi-cylindrical shaped second elongated support member when in a closed position, and further wherein said first and second elongated support members are offset such that said first upper end of said first elongated support member extends above said second upper end of said second elongated support member;
- a connector for joining said first elongated support member to said second elongated support member such that said first connecting point abuts said second connecting point;
- a handle located on said first upper end of said first elongated support member and flush with said second elongated support member; and
- a means for limiting a relative angle between said first and second elongated support members located at a predetermined location intermediate said upper and lower ends of said first and second elongated members.

25. A golf club stand, comprising:
- a first elongated support member having a first upper end, a first lower end and a first connecting point located at a predetermined location intermediate said first upper end and said first lower end;
- a second elongated support member having a second upper end, a second lower end and a second connecting point located at a predetermined location intermediate said second upper end and said second lower end;
- an opening in an upper half of said first elongated support member;
- a metal pin with incised threads and a broad slotted head that can be driven as a fastener through said opening of said first elongated support member located in an upper half of said second elongated support member which fits into said opening of said first elongated support member and is secured by a nut and a washer; whereby said opening and said metal pin, when fastened, allow for slidable extension and closure of said first and second elongated support members relative to each other;

a handle integral with said first upper end of said first elongated support member which is flush with said second elongated support member; and a means for limiting a relative angle between said first and second elongated support members comprising an arcuate groove in the upper half of said first elongated support member and a rod extending from said second elongated support member in the upper half of said second elongated support member, which fits into said groove to limit the relative angle, when extended, between said first and second elongated support members, wherein said first and second elongated support members are offset such that said first upper end of said first elongated support member extends above said second upper end of said second elongated support member.

* * * * *